United States Patent Office 3,393,074
Patented July 16, 1968

3,393,074
PREPARATION OF CAKE-LIKE DESSERT AND DRY-MIXES FOR THEIR PREPARATION
Joseph R. Ehrlich, 1793 Riverside Drive,
New York, N.Y. 10034
No Drawing. Continuation-in-part of application Ser. No. 373,865, June 9, 1964. This application Aug. 16, 1965, Ser. No. 480,148
5 Claims. (Cl. 99—92)

This application is a continuation-in-part of co-pending application Ser. No. 373,865, filed June 9, 1964. In such application a new approach in dessert making is described. In this application dry-mixes were described which, after simple mixing with water and transferring the moist mix into a cake mold, were transformed into solid desserts, such as cakes, cookies, "brownies," etc., without baking.

Pre-mixed cake and cookie mixtures are well-known. Generally, water or milk or fat or eggs must be added, and, after mixing, the entire blend is poured into a mold and has to be baked. Sometimes the mixture consists of several packages, for example, eggs containing flour, fat, sugar, baking powder, flavoring agents and other ingredients, whereas a separate package may contain dry egg white which has to be dissolved in water and whipped before combining it with the contents of the other package or packages. There are other variations too, but all have the one thing in common that they have to be baked at elevated temperature, customarily between 200° F.– 450° F. for a certain period of time which may vary in general from 20 to 60 minutes. Desserts made with such pre-proportioned mixtures are considered to be "home-made."

A housewife can also have a quick solid dessert by simply defrosting or perhaps quick-heating a frozen dessert. A frozen dessert, however, is not different from a fresh, bakery-made dessert, except that it has longer shelf-life and can be preserved as long as it is kept in the frozen state. This type is not a "home-made" dessert. For the purpose of this invention, a "solid" dessert-like food is one which comes as a coherent mass which can be cut with a knife, can be pierced and picked up with a fork without dripping or crumbling, which can be held in the hand without making the hand substantially moist or sticky, and which does not exhibit properties of flow when at room temperature of 70° F. to 75° F. under atmospheric pressure.

In contrast to that, the only complete "instant desserts" which are known up to now which can be prepared from powder mixes without baking are semi-solid, such as jellies and puddings. Normally, they require chilling after mixing with water or milk. They are not ready to be eaten immediately after mixing, but require some setting time.

The new dessert mix has obvious advantages over the hitherto known dessert and cake mixes as well as over frozen desserts. The new dessert mixes have a long shelf-life without any refrigeration. The preparation of the desserts takes only a few minutes, and they are ready to be eaten without baking or chilling. Furthermore, the dessert mixtures may be a completely preportioned mixture of a definite kind, for example, a chocolate cake or a mocha cake, etc., or it may be a general, more or less neutral cake base or cookie base containing dough, sugar and whatever else is necessary, as will become apparent later in this specification, to which, as desired, other dessert nutrients such as cocoa, chocolate chips, milk-powder, nuts, dates, raisins, etc. and/or flavoring agents might be added, thus permitting a housewife to make an instant cake without baking and give her a last minute choice as to what kind of cake it will be.

The dessert mix can be kept in paper boxes, plastic bags or pouches, metal foil wrappers or any suitable wrapping. However, it is preferred to use a wrapper which will provide a reasonably good water vapor barrier, so as to maintain a predetermined moisture content in the mix. The mix can be packed in one package, or be divided into several proportioned packages, each containing one or more components of the total mixture.

It may be desirable to provide dry mixes in bulk of which portions thereof are to be used from time to time. In this case, it is desirable to use separate packages of dry mixes, for example, one package containing the large particles of the mix and another package containing smaller particles of the mix, but all packages containing blends which are pre-portioned. Then a predetermined quantity of each package will have to be combined for mixing with water.

The new mix consists mainly of comminuted pre-baked dough, preferably but not necessarily of various particle sizes.

The pre-baked dough particles may, but by no means have to be partly or fully dehydrated. If the mix is enclosed in an air-tight wrapper, it is advantageous to keep the moisture content of the pre-baked dough particles not higher than substantially 16%, preferably around 10%, to avoid possible mold formation. However, when the dry mix contains a considerable amount of added sugar in powdered or granulated form, the mixture is quite well protected from mold formation, even if the moisture content is higher. Preservatives may or may not be added.

To these pre-baked dough particles is added an edible binder or adhesive which can be activated by water or by an aqueous beverage, such as milk, coffee, wine, diluted liquor, fruit juices, etc. The activating liquid can be cold or warm; it can also be carbonated. This added edible binder is either in the form of a fine powder thoroughly intermixed with the pre-baked dough particles and/or whatever other ingredients are in the dry-mix, or is built into the dough particles, provided that the dough is formulated and pre-baked in such a way that the property of the binder to remain activatable by water is not destroyed. The granulated or powdered binder can also be packed separately, either alone or together with one or more of the other ingredients of the mix. The contents of such separate package, containing the binder, may be added to the base mix, either dry or dissolved in water, at the time the dessert mix is activated and the dessert is being prepared. Another way of adding a water-activatable binder is by coating pre-baked dough particles with an edible binder which lends itself to such coating procedure. The coating is carried out by first preparing a concentrated solution of a readily soluble binder in water; this solution is then sprayed as a very fine mist into the particles from several directions while they are kept in motion. Temperature conditions, air movement and distance between the spray nozzle and the particles are controlled in such a way that the droplets are almost dry when they hit the particles. After spraying, the particles are kept in motion until completely dry to prevent agglomeration.

Depending on the nature of the binder, the amount of the binder may be less than 1%, for example, 0.8% or more, 3.6% or even as much as 25% of the weight of the finished dessert or from about 1% to 30% of the dry mix. The binder or adhesive may be more than one individual material.

Any water soluble edible product which can attain or provide a degree of tackiness or binding capacity when moistened with water, such as a variety of soluble mono-, di- and poly-saccharides, for example, various sugars, hexoses, pentoses, arabinoses and derivatives, such as arabino galactan, ordinary cane sugar, etc., may be used as a binder, provided they are contained in the dry mix as a separate entity and/or have been added after the base has been pre-baked, or they might be edible hydrocolloids. Such edible hydrocolloids might be water-soluble or water-dispersible, or might be just hydrophilic enough to swell or gel or get tacky in contact with water. Such hydrocolloids and polysaccharides might be natural or processed, or might be synthetic, edible gums; they might be proteins and their derivatives, etc., or carbohydrates and/or their derivatives, etc.

Examples of such products are: acacia, karaya, guar flower, locust bean, gum Arabic, tragacanth, Irish Moss, Indian gum (Ghatti), alginic acid and aliginates, agar-agar, pectin, methyl cellulose, carboxy methyl starch, hydroxy methyl propylcellulose, CMC, gelatin and hydrolyzed gelatin, egg albumen, milk protein, a variety of polysaccharides, starches including gelatinized starches, vegetable proteins, including hydrolized vegetable proteins, etc., and mixtures of such products. Barley, mannitol, dextran, sago, etc., are also products belonging to either one or both of the aforementioned groups. A preferred binder may be prepared from a blend of sugar dissolved or dispersed in fresh egg white or in a solution of egg albumen or of gelatin solution in water, evaporating the water at temperatures below 250° F. in any known way and grinding the dry mass to a powder. The quality of such mixed binder can be enhanced by foaming the egg white or albumen or gelatin solution prior to mixing with sugar and drying. Foaming may be achieved by any well-known means. It may be foamed by pressing the protein-containing liquid with a gas, preferably carbon dioxide under considerable pressure, through a foaming nozzle. For an even better result, such liquid may contain an edible foaming agent. Spray-drying of the foamed or unfoamed solution is a preferred way of drying. The foregoing list of examples of binders is by no means complete but is indicative of the type of binders which can be used for the intended purpose.

The pre-baked dough can be bread crumbs, cracker crumbs, comminuted dry or fresh sponge cake, cookies, tea biscuits, etc. While in principle most any pre-baked dough-like material in small particles can be used in these instant cake or dessert mixes together with a proper binder and other additives, as will be described in the examples, it was found that cake formulae and crumbs can be specially designed to give optimal results in dry mixes to be converted into solid dessert-like foods without baking, as will be shown later on.

The amount of water to be added is about 1 g. for every 4–5 g. dry-mix if the same contains, for example, air-dried but not dehydrated pre-baked dough particles. However, it could also be from 1.3 g. to 6.5 g. dry-mix for 1 g. water. The water can be cold or warm. The exact amount of water will change for every type of dessert and every type of dry-mix. Freshly baked cakes normally have a moisture content from 25% to 50%. The amount of liquid to be added to an "instant cake" dry-mix in order to end up with a finished cake of desirable moisture content can be calculated and/or predetermined. The necessary amount of water will depend on the residual moisture content, if any, of the comminuted, pre-baked dough particles, on the amount of water necessary to activate the binder or binders and the water-absorptive power of any other ingredient of the mix, including the binder. Some of the ingredients of such dry-mixes might be water absorbent, others might be water-soluble in various degrees and some might be neither soluble nor absorbent. As an example, for each type, the following shall be mentioned: finely powdered cocoa which is water-absorbent, powdered instant coffee which is water-soluble, and chopped nuts which are neither absorbent nor soluble. Dehydrated fruit powders might be partly soluble, partly absorbent.

Similarly, pre-baked dough particles might have various degrees of absorbency. Two different pre-baked dough types in small particles of equal moisture content might have different absorbency. Pre-baked dough particles containing fat have less water absorbency than others without fat, and smaller dough particles also tend to absorb slightly more liquid than larger ones. Particles of some type of pre-baked dough might become dry, hard and tough after losing water and some other type of pre-baked dough with an equal residual moisture content might be dry, soft and crumbly and would absorb water quickly whereas the tough particles would require some time to become soft.

When the dry-mix is packed in divided packages, it is preferred that the binder not be packed with the pre-baked dough particles, but separately, or together with flavoring and/or sweetening agents and that this portion be dissolved separately in water which may be cold, warm or hot, depending on the binder and provided that the binder is completely soluble. The package with the pre-baked dough particles might contain sugar and other additives as the examples will show more clearly.

To prepare the dessert, the dry mixture is put into a mixing bowl, and a measured amount of water is poured over the mix containing the binder or the water with the dissolved binder in it, is added to the dry-mix, and the entire blend is thoroughly mixed with a spoon or with a mechanical mixer. The dry-mix absorbs the liquid immediately, forming a crumbly, slightly moist or even apparently dry mass, and is transferred into a mold, which can be made of glass, metal, plastic, waterproof cardboard, etc. To facilitate the removal of the dessert, the mold may be lubricated with fat or oil. Since the mass is not baked, it hardly sticks to the mold, and the dessert may also be removed without the use of mold lubrication by just loosening it with a knife. The crumbly mass in the mold is covered with waxed paper, plastic or foil, etc., and slightly compressed by hand. The paper is removed and the mass is left alone for 3 to 10 minutes to set, whereupon it may be removed from the mold as one solid, finished piece which may be cut into portions and is ready to be eaten. However, most of the dry-mixes made in accordance with this invention yield solid desserts which are ready for immediate use as soon as they are packed into a mold. They may be removed from the mold within seconds and are immediately ready to be cut and eaten.

Instead of using a waxed paper for compressing the moist dry-mix, a rubber scraper or the back of a spoon can be used for pressing down the mass. Plastic molds, especially when flexible, have the advantage that the cake can slide out easily when the mold is turned upside down, even without the help of a lubricant or without prior loosening with a knife.

The texture and density of the instant solid desserts, such as cakes or cookies will depend on various factors. Some of those factors are the composition and baking method of the pre-baked dough particles, their moisture content, their degree of hardness or resilience, the density of the particles and their size, the uniformity or lack of uniformity and diversity of particle size, the amount of water-soluble ingredients of the dry-mix, the presence of additives capable of swelling and the pressure applied when packing the moist mix into the mold. Ordinarily, when a cake is baked, the batter contains air cells which are produced by heating or whipping and/or by leavening or gas forming agents. The air or gas expands in the hot oven and makes the cake rise, thus creating air cells in the cake. Therefore, it is well known that the created texture of cakes may vary greatly. With the instant solid dessert of this invention the situation is quite different and almost the reverse. The moistened particles when being transferred into the mold are quite loose. The air space between them has to be reduced by compressing the loose mass. The pressure must be sufficient to make the particles adhere to each other with the help of the binder. But any compression beyond that point is only necessary when a more compact dessert is desired, such as with cookies or brownies or similar foods. Pre-baked dough particles without a binder, when moistened with water do not hold together under any compression, once the pressure is removed.

The only known instance where compressed pre-baked dough particles, namely, cracker crumbs, are presently used is in the preparation of pie-bottoms, shells or crusts. However, in this case, water is not used. The crumbs are held together by butter or some other plastic fat. Sugar is added for sweetening. Strong pressure must be exerted to form a sheet-like, substantially non-porous mass which normally must stay supported from underneath by a dish to prevent it from crumbling. Liquid fat or oil cannot be used since that would not hold the crumbs together. After pressing the mass the pie shell is then either chilled for an hour or baked at 450° F. Aside from the fact that a pie bottom is not a complete solid dessert but only a part of a dessert, it is also entirely different from the finished product made according to the present invention in texture, taste, appearance and composition, and it is not moist.

The present new instant solid desert dry-mixes present an entirely new approach in dessert making. They are novel not only because they permit the quick preparation of a solid dessert, such as a cake, without baking, using factory-prepared, competitively-priced raw material, but also because the self-contained additives of the mix completely transform and mask the taste and character of the pre-baked material. For a better understanding this will be explained in detail.

The pre-baked material may be baked from a batter composed of 30 parts flour, 30 parts sugar, 24.4 parts egg white and 15.6 parts egg yolk, all parts by weight. This batter may be flavored with vanillin and also contain some salt. The amount of sugar in this formula is sufficient to yield a desirable batter but not a sweet cake. Such material when prepared and baked in any way well known to the art will be a more or less fluffy cake which may be shredded while still moist and then the moisture content is reduced to about 12%. It may also be baked until it has a moisture content of about 12% and then be ground. The second method will yield smaller particles. Since such baked material does not contain any fat, there will be no rancidity problem even on long storage. However, the baked and partly dehydrated material might get stale over a long storage period. The crumbs will be soft and brittle and they will eagerly absorb water. If water is added and the moist crumbs are compressed into a mold, they will not form a cake but remain a moist rather tasteless crumbling mass. If, however, an additional amount of sugar, approximately as much as was already in the dough, or more, and some vanillin in dry powder form, or some lemon flavor in powder form, together with a small amount of a hydrocolloid, for example, finely powdered gelatin, is added to these small, neutral, baked particles, said mix will yield, with water and pressure, a fresh-tasting, vanilla cake or lemon cake, just properly sweetened. The sugar and the flavoring materials which are intermixed in powder form with the baked particles will not get stale and are capable of completely masking any staleness of the mix, should such staleness have set in, thus yielding a fresh-tasting vanilla cake. If lemon flavor was added, it will be transformed into a lemon cake, thus changing the taste and character of the baked material which originally, when fresh, had vanilla flavor. However, by adding still more and/or other additives to said mix, the taste and character of the neutral, baked particles can be drastically changed, yielding a cake completely different in color, flavor and taste from the originally baked material.

This process, and the resulting material, should not be confused with the reconstitution of dehydrated food with water. To begin with, this cake mix does not have to be dehydrated; it may have a considerably high moisture content. The addition of water to dehydrated food merely reconstitutes the original product from which the water was eliminated; neither does it change the flavor or taste of the original product, nor does it mask it, nor does it build up solid large pieces from smaller particles. Masking the flavor of stale material by itself can be considered a change in flavor, even if the same kind or type or flavoring agent is being used for masking which was originally in the fresh material. The masking and/or flavor- and taste-changing material must be present, however, in the form of dry additives on top of the already baked-in flavor, sugar, etc. And finally, it is not the water that reconstitutes the solid desert from smaller particles, but the binding material. The water serves only as an activator for the binder. In doing so it may also replace lost water in those cases where partly or completely dehydrated food particles are being used.

Though it is preferred for the purpose of this invention to use baked material which is sepecially formulated, baked and particularly designed for these solid instant dessert mixes, almost any baked dough in small particles can be used. The general aspect of this novel idea shall be further illustrated by the following example. Tea biscuits or graham crackers which are normally baked to a moisture content of from 4% to 10% water are of a soft-brittle, crisp nature, crumbling easily and having a taste which is characteristic for this type of baked goods. The use of either such biscuits or crackers in comminuted form as a base material and the addition of powdered binder, sugar, dessert nutrients, such as nuts, chocolate chips, cocoa, ground coffee, milk powder, dried fruits, etc., and flavoring agents, will make dry mixes which, upon the addition of water and appropriate packing into a mold, will yield desserts which are completely different from the original base material in character, texture, color, flavor, and taste. The result might be solid desserts which might be compared to or be identified as nut cakes, mocca cakes, chocolate cakes, fruit cakes, brownies, etc., or might yield new types of solid desserts.

Broken pieces of crackers, bread, zwieback, dried-out cake, etc., have been used before in freshly-baked goods or puddings, but only as additives in relatively small portions. Hardly have they been used as the main base of any dessert and never have they ever been used without additional baking or cooking.

The binder particles might completely dissolve, then gel, then set or they might merely swell and set or just get sufficiently tacky to hold other, non-tacky particles together; or they might just form a tacky solution with the water which is absorbed by the non-tacky pre-baked particles, thus rendering their surface tacky. Or, the pre-baked dough particles can be made to become tacky or adhesive through contact with water which will act as an activator. This can be done by either coating and drying the pre-baked dough particles with water-activatable binder, as previously described or by using specially baked dough particles. The build-up of large pieces of instant solid desserts from substantially powdery dry mixes can also be enhanced by other additives which can be considered binder contributors or binder aids. Examples are dehydrated, powdered fruits with either high sugar content, such as dried date powder or with pectin and sugar content such as dried citrus or apple powder.

The degree of compression, the combination of different sizes and shapes of the pre-baked particles, the adhesive strength of the various binders, the amount of water used and the prevailing moisture content of the dry mix, as well as the composition of the pre-baked dough particles, are all interrelated factors which can determine the texture, the density and therewith the volume of a given weight of dry mix in the finished dessert. Particle sizes of the various ingredients of the mix (for example, cocoa, sugar, binder, pre-baked dough, etc.) might vary from 325 mesh to 6 mesh or less. If the pre-baked particles are derived from a porous cake-like material by shredding it while it still has full moisture content, the particles will be coarse and will have a rugged surface.

After partly drying those particles, they will still substantially maintain their size and shape but during the blending process with other components of the dry mixes, part of them will disintegrate into smaller particles. A good percentage of smaller particles, not all of which have to be pre-baked dough, is necessary to fill in and/or narrow the gaps and interstices between the larger particles. The degree of disintegration of the pre-baked dough particles into smaller particles during blending will depend on the blending time which might be anything from 10 to 30 minutes in bulk-batch processing or be quite different in continuous blending. The disintegration will also depend on the hardness, toughness, brittleness, porosity, density, etc. of the pre-baked dough which, in turn, will depend on the formulation and preparation of the baked material. Baked material which is soft and crumbly should not be mixed too long lest it disintegrates into dust. Instant solid desserts made from mixes containing a high percentage of dust and powder are quite dense. If such dense desserts are desired mixes of small particles of closely similar sizes can be used and bulk blending, for example, in a ribbon blender, is possible or desirable. Since small, dry particles have a tendency of slipping through between larger particles, a sort of stratification or separation takes place in such blends.

Mixes which do not display stratification to any appreciable degree can be easily packed into multiple portion units, and fairly uniform portions can be taken out of any such package to be mixed with an appropriate quantity of water. Such mixes contain preferably baked dough particles of considerable toughness so as not to crumble further during the blending operation. Such particles may have diameters of about 2 to 3 mm. However, mixes composed of various particle sizes should not be bulk-batch blended but should be filled from proportioners into unit packages which may move on a conveyor band. For preparing a dessert, the total content of such packages should be mixed with the prescribed quantity of water.

The following formulae are examples of baked material which lend themselves especially well for certain types of instant solid dessert dry mixes. The handling and mixing of the ingredients, their sequence of addition and the general preparation of doughs are so well known to the art that they do not require any special description. Only where the procedure deviates from the known art will the details be given together with the formulae. All percentages are per weight.

Example A

| | Percent |
|---|---|
| Type 3 flour | 53.0 |
| Granulated sugar | 16.0 |
| Vanilla flavored sugar | .7 |
| Salt | .51 |
| Powdered eggs | .7 |
| Vanilla flavor | .1 |
| Powdered milk | .8 |
| Mono calcium propionate | .17 |
| Ammonium bicarbonate | .52 |
| Corn syrup | 4.5 |
| Water | 23.0 |

This formula does not contain any fat. After the dough is well mixed and kneaded, it is extended or rolled into a continuous thin sheet onto a moving baking conveyor where it is baked at 400° F. directly to a moisture content of approximately 10% water. The crisp material is crushed or ground, then screened through several sieves to separate, remove and sort the particles from those which are too large and/or too fine. The desirable sizes of the particles are between 16 and 100 mesh, with preferably not more than 20% of the smallest size present. These particles are sufficiently hard so as not to disintegrate appreciably more when blended in a ribbon mixer with other ingredients of the dry mix, yet are absorptive enough to soften quickly when mixed with water.

When the same formula dough is gradually diluted with water until it becomes a fluid dough dispersion, it can be sprayed through spray nozzles with compressed air against a large rotating heated stainless steel cylinder on which it is spray-baked as the cylinder turns. A knife-scraper takes the baked dough off the drum in flakes and/or in slightly porous particles, which, due to agglomeration, are larger than the fine droplets which are sprayed onto the drum. This spray-baking produces rapidly baked dough particles which are desirable for instant solid dessert mixes. This single step process bakes and comminutes the baked dough into particles of the correct size and properties, without the need of drying and grinding equipment.

Example B

| | Percent |
|---|---|
| Flour | 30 |
| Sugar | 30 |
| Egg white, fresh | 28 |
| Egg yolk, fresh | 12 |

The egg white and yolk are separately foamed, either by mechanical action or by aeration by compressed air or an inert gas, and foamed by forcing them with pressure through foam nozzles. $CO_2$ is preferred as the pressing gas because it is slightly soluble in the aqueous material. A small amount of foaming agent such as glyceryl mono stearate or other mono and diglycerides derived by glycerolysis of edible fats or oils can be dispersed in the egg white and yolk to enhance the foam formation. The foams are then blended with the sugar and flour in a way well known to the art; salt may be added. The dough is baked on a conveyor belt at 360° F., shredded into smaller particles which are heated on a conveyor belt until the desired moisture content is reached. 12% to 14% moisture will produce a good all-purpose base material for a variety of instant solid dessert dry mixes. The particles are of medium hardness. With higher moisture content, they can be bulk mixed, but when the moisture content is 11% or less, they should be mixed and packed directly into portion units by proportioners and on a vibrating conveyor.

Example C

| | Percent |
|---|---|
| Flour | 30.0 |
| Sugar | 30.0 |
| Fresh egg white | 31.66 |
| Fresh yolk | 8.34 |

It is desirable to add a preservative, such as .1% of sodium benzoate to egg white and an antioxidant such as .02% of propyl gallate to the yolk, because this dough will not be baked as thoroughly as most other doughs. The foaming of egg white and yolk can be done in any way, such as described in Example B, and also the blending and mixing with flour and sugar as in Example B. The baking, however, is done at not more than 315° F. and for a shorter period than normal. If the dough is oven baked, it should be baked not longer than 45 to 50 minutes at 315° F. The high egg white content, together with the baking at low temperature and the absence of fat, yield a cake material with a "built-in" binder, because there is a sufficient amount of egg white present which is still activatable by water. Water alone can sufficiently activate these particular dry cake particles to make them adhere to each other under pressure. After baking, the material is shredded and air-dried to about 10% to 13% moisture content.

A similar result with respect to the binding of particles may be obtained with a formula as described in Example D

| | Percent |
|---|---|
| Flour | 30 |
| Sugar | 30 |
| Fresh egg white | 29 |
| Fresh yolk | 9 |
| Powdered gelatin 325 mesh | 2 |

The gelatin is first dispersed in the egg white and then the procedure is exactly as described in Example C.

Example E

| | Percent |
|---|---|
| Flour | 25 |
| Sugar | 27.0 |
| Vanilla flavored sugar | 1.5 |
| Fresh whole eggs | 12.0 |
| Fresh yolk | 20.5 |
| Salt | .5 |
| Milk | 5.0 |

The yolk should contain 0.05 part of an antioxidant such as a mixture of

| | P.p.w. |
|---|---|
| Butylated hydroxyanisole | 20 |
| Propylgallate | 6 |
| Citric acid | 4 |
| Propylene glycol | 70 |

The procedure for preparing the batter is the same as in Example B. This batter is well baked at 350° F., then shredded with a moisture content of about 12.5%, and then blended with the other ingredients of the dry-mix. The particles are soft and absorb water quickly.

Example F

| | Percent |
|---|---|
| Flour | 22.5 |
| Sugar | 24.2 |
| Whole eggs | 32.0 |
| Fat, containing emulsifier | 4.6 |
| Water | 16.7 |

The emulsifiers, which may be mono- and diglycerides, derived from edible fats or oils, are melted together with the fat and mixed with the eggs. Flour and sugar are blended in and finally the water is added. The mix is then forced by compressed $CO_2$ through foam nozzles directly onto a hot, revolving baking drum, where the foam bakes in 30 seconds or less. While the drum is rotating, a knife-scraper scrapes off the baked dough as porous flakes and crumbs. This is a one-step baking and comminuting process.

Example G

| | Percent |
|---|---|
| Flour | 23.0 |
| Sugar | 25.0 |
| Vanilla flavored sugar | 1.0 |
| Fresh full eggs | 40.0 |
| Cocoa | 7.0 |
| Fat | 4.0 |

The eggs are separated into yolk and white and are separately foamed by any known method, or as described in Example B. The batter is then blended and prepared in any way known to the art of cake-making and is then baked at 350° F. The shredded particles can be reduced to a moisture content of from 10% to 16% and serve as an excellent, soft base for chocolate instant solid dessert dry mixes. The chocolate-containing dry mixes for making chocolate cakes, brownies, etc., preferably contain a separate admixture of cocoa or chocolate powder, regardless of whether the dry mix base is made of a white neutral baked material or of a chocolate-containing material, but the base of this example is richer in taste and especially in color. The particles are soft, and cakes made with this base are fluffy and very smooth. Another special base for solid chocolate desserts is described in the following Example H.

Example H

| | Percent |
|---|---|
| Flour | 26.0 |
| Sugar | 24.0 |
| Fresh whole eggs | 12.0 |
| Bitter chocolate | 12.0 |
| Fat | 13.0 |
| Whole milk | 12.0 |
| Baking powder | 1.0 |

The fat should contain antioxidants, such as described in Example E. Fat and chocolate are melted and whipped with the eggs and then blended with the rest of the ingredients. Baking is done at 350° F. This very rich base material is shredded and may be used in solid instant dessert mixes at is, without any further drying.

The following examples shall illustrate various compositions of instant solid dessert mixes and desserts made from them.

Example 1—Chocolate cake

| | P.p.w. |
|---|---|
| Air-dried, shredded sponge cake | 26.7 |
| Crushed, baked tea-biscuit dough | 13.3 |
| Graham cracker crumbs | 52.0 |
| Cocoa | 8.0 |
| | 100.0 |

This mix forms Portion I. Portion II consists of:

| | P.p.w. |
|---|---|
| Granulated gelatin, 200 Bloom grams | 1.47 |
| Vanillin | .30 |
| Granulated sugar | 36.00 |

Portion II is dissolved in 22.7 p.p.w. of hot water (70°–80° C.).

Portion I is placed into a mixing bowl and the ingredients are thoroughly mixed. The solution, containing Portion II is poured over Portion I and the entire mass is thoroughly mixed. The mix forms a crumbly, slightly moist mass which is filled into a cake mold and slightly compressed by hand. After standing for five minutes in the mold at room temperature of 70°–75° F., the finished chocolate cake may be removed from the mold.

Example 2.—Mocha cake

| | P.p.w. |
|---|---|
| Finely shredded sponge cake, fresh or air-dried | 25.3 |
| Graham cracker crumbs | 41.3 |
| Finest powdered gelatin (300–325 mesh) 225 Bloom grams | 1.5 |
| Vanillin | .2 |
| Instant coffee | 1.2 |
| Powdered sugar (confectionery grade) | 30.5 |
| | 100.0 |

These ingredients are placed into a mixing bowl and thoroughly mixed. 16.5 p.p.w. hot water at 70°–80° C., or 19 p.p.w. warm water at 50° C., or 26 p.p.w. cold water are poured over the blend and thoroughly mixed until the mass has a uniform brown color. The crumbly mass is tranferred into a mold, covered with a piece of waxed paper, slightly compressed and left to stand. After three or four minutes, the cake is set so that it can be cut into portions, or it can be filled with jam, marmalade, etc. and/or can be covered with an icing. Depending on whether the water was cold, warm or hot, and further depending on the amount of water and pressure applied, a soft and fluffy, or dry and fluffy, or more compact cake may result. When granulated sugar is used in place of powdered sugar, and cold water is added, a slightly crunchy effect might be obtained because of incomplete dissolution of sugar.

Example 3—Cake base

Portion I:                                              P.p.w.
  Air-dried shredded sponge cake _____ 65.5
  Granulated sugar _____ 34.5
                                         100.0

Portion II:                                             P.p.w.
  Granulated gelatin 200 Bloom grams _____ 1.75
  Vanillin _____ .25

For using the cake base to make a variety of different cakes one may proceed as follows:

To Portion I may be added either 29 p.p.w. chopped hazelnuts, or
29 p.p.w. chopped walnuts, or
29 p.p.w. chopped almonds, or
29 p.p.w. mixture of dried raisins and pecans and dash of cinnamon, or
29 p.p.w. chocolate chips, or
29 p.p.w. mixture of chopped figs, nuts, dates, and chocolate, or
29 p.p.w. ground chocolate, etc.

Portion II is dissolved in 21.5 p.p.w. warm water (55–60° C.) and added to the enriched Portion I, with thorough mixing. Forming and setting of the cake is as described in Example 1.

The sponge cake in the previous and following examples can be a baked dough made in accordance with procedures which are well known to the art, using for example:

|  | P.p.w. |
|---|---|
| Fresh egg yolk, beaten | 13.9 |
| Fresh egg white, beaten | 25.2 |
| Sugar | 30.6 |
| Sifted flour | 28.6 |
| Salt | .2 |
| Vanilla extract | .8 |
| Baking powder | .6 |

Preservatives may be added to the dough, if desired. The antioxidants, such as for example, 0.05 p. of a mixture consisting of:

|  | P.p.w. |
|---|---|
| Butylated hydroxyanisole | 20 |
| Propylgallate | 6 |
| Citric acid | 4 |
| Propylene glycol | 70 | may be dissolved in the egg yolk. In the egg white, for example, 0.1 p. of sodium benzoate may be dissolved.

Another dough which may serve as the basic ingredient of the cake base is known as "angel food cake" and may consist of:

|  | P.p.w. |
|---|---|
| Flour | 26 |
| Sugar | 39 |
| Egg white | 35 |

Baking powder, lemon juice, vanilla and salt are added in very small amounts, similar to that in the previous example. The dough is again prepared and baked in a way well known to the art, and, therefore, no further description will be necessary.

Example 4.—"Brownies"

|  | P.p.w. |
|---|---|
| Shredded and oven-dried sponge cake or angel food cake | 47 |
| Sugar powder, confectionery grade | 34 |
| Cocoa | 8 |
| Chopped nuts | 7 |
| Vanillin | .4 |
| Locust bean flour | 3.6 |

26 p.p.w. cold water, under agitation, is added to this mixture until all particles are uniformly wetted. The mass is pressed into a rectangular mold. Under the pressure, the individual particles appear to fuse together and form the cake without further delay. The cake can be removed immediately and can be cut into square portions or, if desired, can first be covered with an icing.

Example 5.—Nut Cake

|  | P.p.w. |
|---|---|
| Baked and shredded dough | 46.8 |
| Ground nuts | 22.0 |
| Sugar, confectionery grade | 25.3 |
| Milk protein | 2.1 |
| Gelatin 175 Bloom grams | 1.7 |
| Disodium phosphate | .1 |
| Oleic acid monoglyceride | .2 |
| Vanillin | 1.8 |

These ingredients are thoroughly mixed. 16 p.p.w. of cold tap water, under agitation, is added to this mixture until all the water appears to be absorbed. The mass is compressed in a mold and put in a refrigerator for 5 to 10 minutes, then removed from the mold. The mass has been transformed into a solid nut cake which keeps its texture and consistency at room temperature.

Example 6.—Banana Cake

|  | P.p.w. |
|---|---|
| Air-dried, shredded sponge cake, having an 8% moisture content | 63.2 |
| Dry milk skim powder | 2.0 |
| Confectionery sugar | 30.0 |
| Hydroxyisopropyl methyl cellulose ether 4000 cps. | 4.5 |
| Vanillin | .3 |
| Powdered banana flavor | .05 |

These ingredients are very thoroughly mixed. 26 p.p.w. cold water is added to this mixture and the mass is thoroughly mixed, transferred to a mold and strongly compressed by hand. After 5 minutes, the cake is removed from the mold and allowed another 5 minutes to set before cutting. It also may be filled with jam and covered with an icing. In place of the hydroxy isopropyl methyl cellulose CMC can be used.

Example 7.—Chocolate Cake

|  | P.p.w. |
|---|---|
| Freshly baked and shredded sponge cake, having a 32.56% moisture content | 69 |
| Finely powdered sugar | 27 |
| Cocoa | 6 |

These ingredients are thoroughly mixed. A solution of 1.1 p.p.w. gelatin, 225 Bloom grams, dissolved in 16 p.p.w. of hot water, and .2 p.p.w. vanillin is added to the dry mix, thoroughly mixed and the mass transferred into a cake mold, and slightly compressed. After 5 minutes, a fluffy, soft cake may be removed from the mold:

Example 8.—Lemon Cookies

|  | P.p.w. |
|---|---|
| Comminuted oven dried angel food cake, moisture content 6.8% | 72 |
| Sugar powder | 30 |
| Lemon flavor in powder form (spray-dried lemon juice) | .03 |
| Vanillin | .40 |

These ingredients are thoroughly mixed. A solution of 0.9 p.p.w. low methoxyl pectin, dissolved in 28 p.p.w. of warm water, is added to the mix, mixed and strongly compressed in small molds. After 10 minutes, the cookies are removed and decorated with jam or marmalade.

Following are three examples of different chocolate cake mixes:

Example 9

|  | Grams |
|---|---|
| The dry mix consists of pre-baked dough particles | 62.5 |
| Sugar (6X) | 30.0 |
| Vanilla flavored 6X sugar | 1.5 |
| Cocoa | 6.0 |

The baked dough particles are made according to Example H, and have a moisture content of 19.3%. In this example, the sugar serves as the only binder and also as a preservative. The sugar content is somewhat higher than in other dry mixes. The fat and moisture content of the pre-baked dough is high. The water quantity needed to form a cake is small.

This dry powder is moistened with 15.5 cc. water of ambient temperature, mixed thoroughly, and the moist mixture is transferred to a mold. The mass is slightly or moderately compressed, and immediately removed from the mold. The result is a very dark, rich, moist chocolate cake of very good texture. It can be cut and eaten immediately without any setting time, or may be decorated with icing, whipped cream, etc., before cutting.

Example 10

| | Percent p.w. |
|---|---|
| Pre-baked dough particles | 65 |
| Sugar (6X) | 2 |
| Vanilla flavored sugar | 1.5 |
| Binder | 24.5 |
| Cocoa | 7.0 |

The baked dough particles are made according to Example G. The moisture content is 12.6%. The binder is a blend of 63.0% parts by weight of sugar dispersed in 35.5 parts p. weight of foamed egg white to which was added .5 p.p.w. baking powder; this blend was dried at 230° F. under vacuum, and, after being dried, was ground and screened, using a particle size of about 80–100 mesh.

100 grams of this cake dry mix requires 28 ml. water of room temperature of 70°–75° F. to be activated to form a cake under light pressure. The resulting cake is dark, moist, tasty, fluffy and of excellent texture. It is ready for consumption as soon as it is compressed and removed from the mold.

Example 11

| | P.p.w. |
|---|---|
| Pre-baked dough particles | 63.0 |
| Sugar (6X) | 25.0 |
| Vanilla flavored sugar | 2.0 |
| Cocoa | 8.0 |
| Gelatin powder (4X) | 2.0 |

The baked dough is made according to Example F and has a moisture content of 12.00%. 100 grams of this mixture is moistened and activated with 26.5–27.0 ml. water at 70°–75° F., and the cake is prepared in the same manner as described in Example 10. The cake has a good chocolate color and taste, is ready immediately after it is formed and has a very good texture.

Examples 9, 10 and 11 have been given to illustrate that one type of dessert can be made from different mixes, each containing a different type of dough base and binding compound, and also demonstrating various moisture contents.

Naturally, there are slight differences in taste and appearance between those three chocolate cakes, as there are differences between a variety of recipes for chocolate cakes that can be found in many cookbooks. It is obvious that there is also an almost endless variety in formulations for instant dessert dry mixes, inasmuch as there are innumerable possible combinations of pre-baked dough bases, even if only a small number of them would be used with the great number of possible binders, let alone the other additives which may be added for basic taste or simply for masking purposes or for adding flavor, color, sweetness, spice, etc. Only a few of the possible binders are given in the examples in order to keep this specification from becoming excessively lengthy. More emphasis is given rather to demonstrate the variety of desserts which can be made from instant dry mixes, than to demonstrate the use of the great number of possible binders. However, it shall be stressed again that all the binders and groups and families of binders, as described earlier in this specification, can be used. It should be pointed out that some of those edible hydrophilic binders might have to be present in a greater or lesser percentage depending on their binding power with respect to the other ingredients of the mix or to their respective water requirements for their activation. Many of those binders are substantially tasteless, whereas others might have a light taste, in which cases more or stronger flavoring agents might be necessary to cover such a taste. Some binders also help to add body to the desserts which might result in increased volume. Those binders among the groups mentioned earlier having the property of absorbing and holding relatively large amounts of water swell when moist. When such binders are added in larger quantities to the dry mixes, that is, in quantities more than five percent and up to twenty-five percent, and when the fine binder particles are well intermixed with the pre-baked dough particles, they then push the dough particles somewhat apart, thereby extending the volume of the finished solid dessert. The water requirements of such mixes for sufficiently activating the binder and preparing the instant solid baked goods are considerably greater than in the foregoing examples.

Example 12.—Chocolate cake

| | Grams |
|---|---|
| Pre-baked dough particles | 64.0 |
| Cocoa | 9.0 |
| Sugar (6X) | 2.10 |
| Vanilla | 3.0 |
| Finely powdered gelatin | 2.5 |
| Finely powdered sodium cyclamate | .5 |

The pre-baked dough particles were prepared according to Example B, the moisture content being 13.8%. 26 cc. of cold water was added to 100 g. of the above mix. Mixing and packing into mold is accomplished as described previously and pressure applied. The result is a chocolate cake, a shade lighter in color than those described in Examples 9 and 10. The cake is immediately ready for eating, icing or decorating, etc.

Example 13.—Brownie

| | Grams |
|---|---|
| Pre-baked dough particles | 50.0 |
| Chopped nuts | 13.5 |
| Sugar (6X) | 20.0 |
| Vanilla flavored sugar | 2.5 |
| Dehydrated dates in fine powder | 3.0 |
| Gelatin (4X) | 2.5 |
| Cocoa | 8.5 |

The pre-baked dough particles are the same as in Example 12. 28.5 cc. of water is added. The mixing and packing procedure is the same as in Example 12, but with slightly more pressure applied. The result is a brownie of excellent taste, moisture and texture.

Example 14.—Mocha cake

| | Grams |
|---|---|
| Pre-baked dough particles | 74.0 |
| Finely powdered gelatin | 4.0 |
| Sugar (6X) | 19.0 |
| Vanilla flavored sugar | 3.0 |

28 cc. of black coffee is added to 100 grams of the above mix, and the remaining procedure is the same as in Example 12. The result is a mocca-flavored cake of excellent texture.

Example 15.—Pineapple cake

| | Grams |
|---|---|
| Pre-baked dough particles | 74.0 |
| Gelatin (4X) | 4.0 |
| Sugar (6X) | 19.0 |
| Vanilla flavored sugar | 2.8 |
| Powdered artificial pineapple flavor | .2 |

28 cc. water is added to the above mix, and the remaining procedure is the same as in Example 12. If desired, the cake may be dressed with whipped cream and pineapple slices.

Examples 9 and 10 illustrated mixes for simply masking any possible stale taste which might occur during prolonged storage of the mix, using different pre-baked bases of substantially the same flavor as the finished dessert, namely chocolate cake flavor. The binders are different in both examples, but not necessarily so. In contrast to those, Examples 13 and 15 illustrate the use of the same pre-baked base and same binder in preparing mixes that not only mask any possible stale flavor, but also change the taste and character of the pre-baked base into an entirely different taste and character.

Example 16

|  | Grams |
|---|---|
| Pre-baked dough particles | 70.0 |
| Sugar (6X) | 23.0 |
| Vanilla flavored sugar | 2.0 |
| Gelatin (4X) | 1.0 |
| Methylcellulose food grade | 3.0 |
| Hydroxy methyl propyl cellulose | 1.0 |

The pre-baked dough particles are made according to Example F. A blend of 17 cc. water and 12 cc. rum 80 proof is added to the above mix. The remaining procedure is the same as in Example 12. The result is a rum-flavored white cake.

Example 17

|  | Grams |
|---|---|
| Pre-baked dough particles | 74.0 |
| Binder | 21.0 |
| Vanilla flavored sugar | 4.0 |
| Sodium cyclamate | .8 |
| Powdered lemon flavor | .2 |

The pre-baked dough is made according to Example E. The binder is gelatinized wheat starch, which is made from wheat starch which has been pre-cooked, dried, ground and screened. The particular product used in this example is sold under the name of STARVIS by The Cellulose and Protein Products Department of the Hercules Powder Co. of Wilmington, Delaware. 67 cc. water is added to 100 grams of the above mix. While the powder mix is agitated with the water, the volume of the mix increases visibly. When the mass which appears to be moderately moist is packed into a mold, it exhibits resiliency while it is compressed. But this resiliency disappears once the particles are set in their place. The resulting lemon cake is about 38% larger in volume than any cake made from 100 grams of dry mix of any one of the previous examples.

Example 18

|  | Grams |
|---|---|
| Pre-baked dough particles | 70.0 |
| Sugar (6X) | 22.0 |
| Vanilla flavored sugar | 2.0 |
| Cocoa | 6.0 |

The pre-baked dough has a moisture content of 12.3% and was made according to Example C. No binder is added separately. The binder which is "built-in" in the dough is sufficient to form a solid dessert. 27 ml. water is added to 100 grams of the mix. The mass is agitated until uniformly wetted, then packed into a mold with moderate pressure. The result is a solid dessert with chocolate flavor.

Example 19

|  | Grams |
|---|---|
| Pre-baked dough particles | 70.0 |
| Sugar (6X) | 22.0 |
| Vanilla flavored sugar | 2.0 |
| Cocoa | 6.0 |

The pre-baked dough was prepared according to Example D, with "built-in" binder, but had a moisture content of 5.48%. 33 ml. water is necessary to activate 100 grams of the dry-mix. The remaining procedure is similar to that in Example 18. The result is a solid dessert with chocolate flavor.

Example 20

|  | Grams |
|---|---|
| Pre-baked dough particles | 68.0 |
| Sugar (6X) | 24.0 |
| Vanilla flavored sugar | 4.0 |
| Gelatin (4X) | 3.75 |
| Powdered artificial nut flavor | .25 |

The pre-baked dough was prepared according to Example A, and had a moisture content of 9.9%. 21 ml. water is added to 100 grams of the mix, and the remaining procedure is the same as outlined in Example 12. The result is a cake with nut flavor.

Example 21

|  | Percent By weight |
|---|---|
| Lemon chiffon cake particles containing 5% fat; 15% moisture | 70.0 |
| Gelatinized starch | 3.5 |
| Citrus pectin | 3.5 |
| Binder as described in Example 10 | 22.8 |
| Powdered lemon flavor | .2 |

The lemon chiffon cake is similar to a sponge cake, the only difference being that egg white and egg yolk are separately beaten. The cake had been shredded and dried to a moisture content of 15%.

22 ozs. of the above dry mix plus 9 ozs. water yield a 9-inch cake 1½ inches high. The inherent lemon flavor of the pre-baked base is strengthened with additional lemon flavor.

Example 22

|  | P.p.w. |
|---|---|
| Cake crumbs 16% moisture | 75.0 |
| Gelatinized starch | 9.0 |
| Gelatin 325 mesh | 2.5 |
| Sugar (6X) | 12.0 |
| Vanilla sugar | 1.2 |
| Sodium cyclamate | .3 | are thoroughly mixed and packed in a water vapor-proof wrapper.

The contents of this package can be used within six months storage as a cake base to prepare a variety of cakes with different flavors and/or character. The following are examples of additives which would change the taste and/or character of the dessert:

(a) addition of 30 p.p.w. of raisins
(b) addition of 30 p.p.w. of chopped nuts
(c) addition of 30 p.p.w. of chocolate chips
(d) addition of 30 p.p.w. of ground nuts or ground chocolate
(e) addition of 28 p.p.w. of chopped hazelnuts, and addition of 2 p.p.w. of instant coffee
(f) addition of 15 p.p.w. of mixed dried fruit and vanilla flavor.

When the additives are added, mix with 45 p.p.w. of water of room temperature or warm water, depending whether a cold cake or an oven warm cake is desired, or (g) add 11 p.p.w. cocoa and mix with 50 p.p.w. water or
(h) add 58 p.p.w. of cream cheese dispersed in 40 p.p.w. milk and mix thoroughly with cake base to obtain a creamy cheese cake.

In all the above examples the moist mass has to be packed into a mold with light to moderate pressure. After this is done the finished cake can be immediately removed from the mold and is ready for consumption.

The cake used for preparing the mix can be a half-dried sponge or chiffon cake containing some fat.

It is understood that although certain specific examples and applications have been heretofore mentioned, the invention is not limited thereto, but embraces other examples limited only by the scope of the appended claims,

I claim:

1. A method for producing a resilient solid dessert having the texture of a freshly baked cake comprising mixing the following ingredients:
   (a) a major proportion of pre-baked dough particles having a maximum moisture content of substantially 16 percent by weight and a particle size of substantially 16 to 100 mesh,
   (b) 0.8 to 25 percent by weight based upon the total weight of the ingredients of a solid particulate binder capable of being activated upon contact with an aqueous liquid,
   (c) a sufficient quantity of solid particulate flavoring material to mask any staleness exhibited by said pre-baked dough particles, and
   (d) a sufficient quantity of an edible aqueous liquid to activate said binder and to provide a resulting mixture containing 25 to 50 percent moisture by weight; placing the resulting mixture in a mold capable of supporting the same; applying pressure to an exposed surface of said resulting mixture sufficient to cause said ingredients to adhere and to produce a resilient solid dessert in ready to eat form having the texture of a freshly baked cake which is capable of being cut into portions without excessive crumbling; and removing said resilient solid dessert from said mold.

2. A method for producing a resilient solid dessert according to claim 1 wherein said pre-baked dough particles are prepared by spraying droplets of liquid dough onto a heated baking surface in order to bake the same.

3. A method for producing a resilient solid dessert according to claim 1 wherein said solid particulate binder is an edible hydrocolloid.

4. A method for producing a resilient solid dessert according to claim 1 wherein said solid particulate binder is present as a coating upon the surface of said pre-baked dough particles.

5. A particulate free flowing blend capable upon admixture with an edible aqueous liquid to form a resulting mixture useful in the formation of a resilient solid dessert having the texture of a freshly baked cake comprising the following ingredients:
   (a) a major proportion of pre-baked dough particles having a maximum moisture content of substantially 16 percent by weight and particle size of substantially 16 to 100 mesh,
   (b) 1 to 30 percent by weight based upon the total weight of the blend of a solid particulate binder capable of being activated upon contact with an aqueous liquid, and
   (c) a sufficient quantity of solid particulate flavoring material to mask any staleness exhibited by said pre-baked dough particles.

References Cited

UNITED STATES PATENTS

| 850,070 | 12/1868 | Coleman et al. | 99—90 |
| 518,891 | 4/1894 | Manwaring | 99—90 |
| 701,742 | 6/1902 | Lambert | 99—90 |
| 3,093,488 | 6/1963 | Graham et al. | 99—139 |

FOREIGN PATENTS

| 152 | 1877 | Great Britain. |
| 3,042 | 1899 | Great Britain. |
| 563,170 | 8/1944 | Great Britain. |

OTHER REFERENCES

Bellin, "The Jewish Cookbook," 1941, Bloch Publishing Co., New York, pp. 281, 282, 371.

Cornfeld, "Israeli Cookery," 1962, The Avi Publishing Co., Inc., Westport, Connecticut, p. 253.

Leonard "Jewish Cookery" 1949, Crown Publishers, New York pp. 64, 65, 66, 329.

Loesecke, "Drying and Dehydration of Foods" 2nd ed. 1955, Reinhold Publishing Corp. New York, pp. 3, 4, 1955.

A. LOUIS MONACELL, *Primary Examiner.*

J. M. GOLIAN, J. M. HUNTER, *Assistant Examiners.*